United States Patent [19]
Hosoya et al.

[11] Patent Number: 5,967,627
[45] Date of Patent: Oct. 19, 1999

[54] PRESSURE CONTROL VALVE UNIT FOR HYDRAULIC BRAKE DEVICE

[75] Inventors: Yukio Hosoya; Yoshihiro Ishida, both of Hamakita, Japan

[73] Assignee: Nisshinbo Industries, Inc., Tokyo, Japan

[21] Appl. No.: 08/925,962

[22] Filed: Sep. 9, 1997

[30] Foreign Application Priority Data

Sep. 10, 1996 [JP] Japan .................................. 8-261398

[51] Int. Cl.⁶ ........................................................ B60T 8/36
[52] U.S. Cl. ................................................... 303/119.2
[58] Field of Search ............................. 303/119.2, 119.3, 303/900, 901; 137/599; 251/129.02; 91/443

[56] References Cited

U.S. PATENT DOCUMENTS

| | | | |
|---|---|---|---|
| 5,647,644 | 7/1997 | Volz et al. ............................ | 303/119.2 |
| 5,664,849 | 9/1997 | Burgdorf et al. .................... | 303/116.1 |
| 5,673,980 | 10/1997 | Schwarz et al. ..................... | 303/119.2 |
| 5,683,150 | 11/1997 | Burgdorf et al. .................... | 303/119.2 |
| 5,704,587 | 1/1998 | Kuromitsu et al. .................. | 303/119.2 |
| 5,735,582 | 4/1998 | Eith et al. ............................ | 303/119.2 |
| 5,803,556 | 9/1998 | Weis et al. ........................... | 251/129.02 |

FOREIGN PATENT DOCUMENTS

95/21081  8/1995  WIPO .

*Primary Examiner*—Robert J. Oberleitner
*Assistant Examiner*—Robert A. Siconolfi
*Attorney, Agent, or Firm*—Bret Field; Bozicevic, Field, & Francis LLP

[57] ABSTRACT

A pressure control valve unit for a hydraulic brake device is provided which considerably reduces noise, vibration, and harshness, and is compact and inexpensive. The pressure control valve unit comprises a switching valve and a normally-open inlet valve sequentially located in the main brake line in a housing cavity between the master cylinder and the wheel cylinder(s). During a brake pressure control action, the difference in pressure acting on the master cylinder side and that on the wheel cylinder side causes the switching valve to switch to a constricted channel, thereby noticeably reducing the amount of noise vibration harshness.

10 Claims, 9 Drawing Sheets

PRESSURE CONTROL VALVE UNIT FOR HYDRAULIC BRAKE DEVICE

CROSS-REFERENCE TO RELATED APPLICATIONS

This application claims priority under 35 U.S.C. §119 to Japanese application 8-261398 filed Sep. 10, 1996, which is incorporated herein by reference.

BACKGROUND OF THE INVENTION

1. Field of the Invention

This invention relates to a pressure control valve unit for a hydraulic brake device for vehicles equipped with an antilock brake system (ABS) or a traction control system (TCS).

2. Description of the Related Art

A hydraulic brake device that can electronically control the brake pressure to prevent the wheels from locking during a sudden braking operation or a sudden acceleration is publicly known. It is known that the alternate opening and closing of the solenoid-type inlet and outlet valves in that type of device is accompanied by an abnormal noise, referred to as noise, vibration, and harshness (NVH), and vibration.

Two methods have been proposed as means of eliminating this NVH; the placement of a pressure-actuated switching valve on the downstream side of the inlet valve in the main brake line, or the placement of an independent pressure-actuated switching valve on the upstream side of the inlet valve. However, these methods have the following problems:

1. Placement of a pressure-actuated switching valve on the downstream side of the inlet valve should reduce the NVH, but in some cases there is a prominent high frequency noise.

2. Placement of an independent pressure-actuated switching valve on the upstream side of the inlet valve does reduce the NVH to a certain degree, but a sudden abnormal noise and vibration is generated. Moreover, the introduction of an independent switching valve makes the layout design more complex, and increases the cost.

3. Although experiments have been conducted to incorporate the switching valve inside another solenoid valve, the problems of size and cost have yet to be resolved, and such a design is not yet in practical use.

SUMMARY OF THE INVENTION

In view of the aforementioned problems, one objective of this invention is to provide a pressure control valve unit for a hydraulic brake device which is highly effective in reducing noise, vibration, and harshness.

Another objective is to provide a pressure control valve unit for a hydraulic brake device with fewer parts and therefore more compact and less expensive.

DESCRIPTION OF THE PREFERRED EMBODIMENTS

Figure 1:
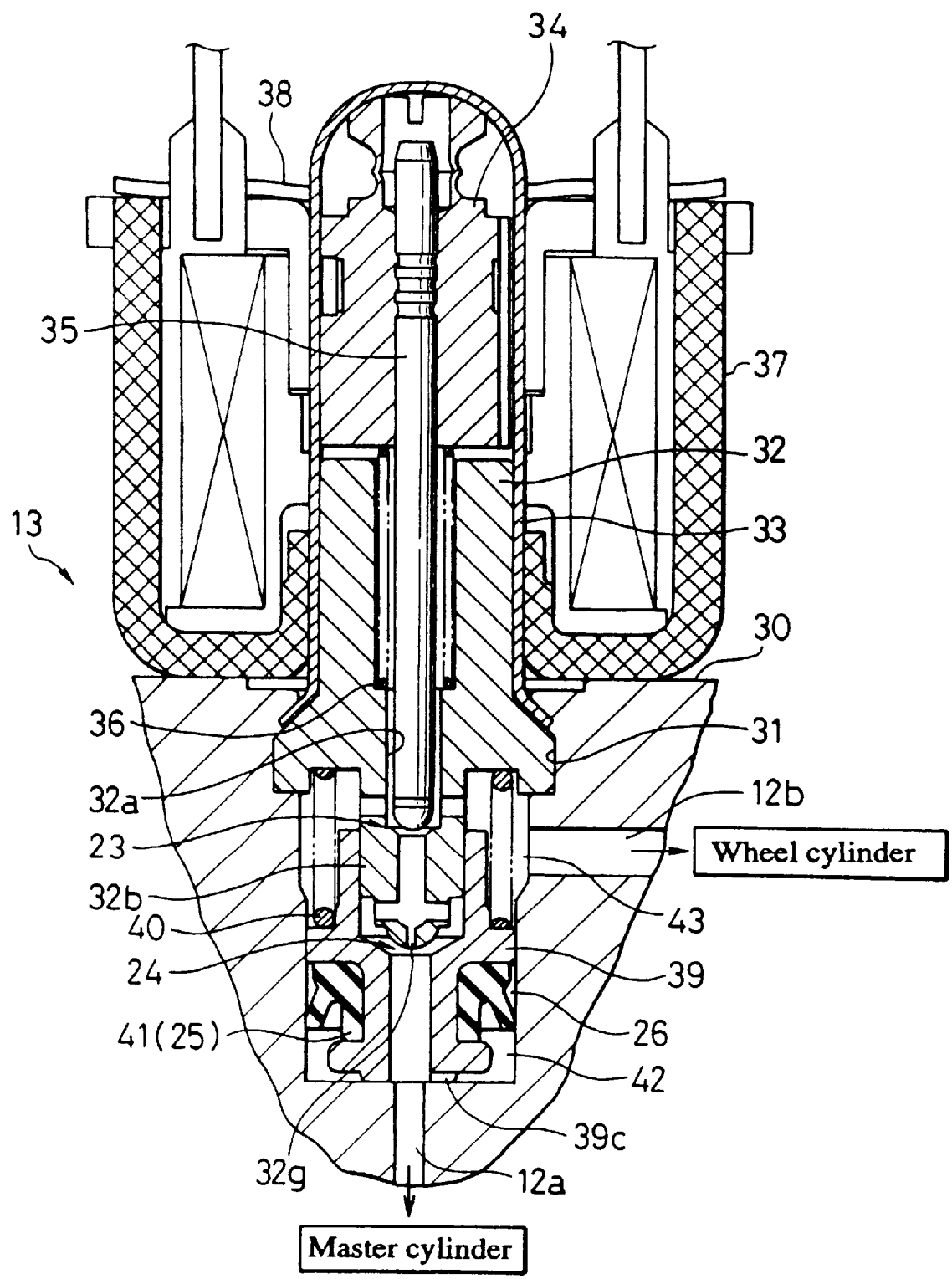
FIG. 1 is a vertical cross sectional diagram of the pressure control valve unit.

In a first aspect of the invention, a novel pressure control valve unit for a hydraulic brake device is provided in which a normally-open inlet valve is installed in a housing cavity in the main brake line connecting the master cylinder and the wheel cylinder(s), and a normally-closed outlet valve and pump are installed in a return line connecting the wheel cylinder and the main brake line on the upstream side of the inlet valve. During normal braking, a switching valve, installed between the master cylinder and the inlet valve routes the brake fluid through a wide channel. However, during a control operation, the difference between the pressure acting on the master cylinder side and that acting on the wheel cylinder side causes the switching valve to switch passage of the brake fluid to a constricted channel.

The inlet valve comprises a sleeve affixed to a cavity bored in the housing, an armature housed to slide within the sleeve and having an integrally molded inlet valve valve plug that opens and closes with electromagnetic force, a magnetic core through which the inlet valve valve plug passes and which, together with the sleeve, is affixed to the housing cavity, and a coil assembly that operates the armature with an electromagnetic force. An inlet valve valve seat, set within a small-diameter segment molded on one end of the magnetic core, and the inlet valve valve plug combine to form the electromagnetically-actuated normally-open inlet valve.

A switching valve valve plug and a constricted channel are molded on the tip of the small-diameter segment of the magnetic core. A cylindrical piston is mounted externally around the small-diameter segment and divides the housing cavity into a primary pressure chamber, with passage to the master cylinder, and a secondary pressure chamber, with passage to a wheel cylinder. A switching valve valve seat, molded inside the piston, and the switching valve valve plug form a normally-open switching valve that switches fluid passage to a constricted channel based on the pressure differential between the master cylinder side and the wheel cylinder side. The switching valve and inlet valve are housed in the housing cavity such that the switching valve is hydraulically positioned on the master cylinder side of the inlet valve.

In a second aspect of the invention, a novel pressure control valve unit for a hydraulic brake device is provided in which a spring is installed to energize the piston in the direction for a normally-open valve.

In a third aspect of the invention, a novel pressure control valve unit for a hydraulic brake device is provided wherein the piston slides such that the switching valve closes and switches to a constricted channel when the difference between the pressure acting on the primary pressure chamber and that acting on the secondary pressure chamber exceeds a threshold value.

In a fourth aspect of the invention, a novel pressure control valve unit for a hydraulic brake device is provided wherein a notched groove forming a constricted channel is molded on either the switching valve valve seat or the switching valve valve plug.

In a fifth aspect of the invention, a novel pressure control valve unit for a hydraulic brake device is provided wherein a secondary constricted channel is formed from a groove molded between the bottom face of the housing cavity and the end face of the piston to provide constant passage between the main brake line on the master cylinder side and the primary pressure chamber.

In a sixth aspect of the invention, a novel pressure control valve unit for a hydraulic brake device is provided wherein a secondary constricted channel is formed from a small cavity bored on the side face of the piston that provides constant passage between the main brake line on the master cylinder side and the primary pressure chamber.

In a seventh aspect of the invention, a novel pressure control valve unit for a hydraulic brake device is provided wherein a release channel is molded in the piston which allows brake fluid between the housing cavity and the circumference of the piston to flow only from the secondary pressure chamber to the primary pressure chamber, thus enabling the brake fluid from the wheel cylinder to bypass the said inlet valve and switching valve and return immediately to the master cylinder.

It is to be understood that while the invention has been described in conjunction with the preferred specific embodiments thereof, that the description above as well as the examples which follow are intended to illustrate and not limit the scope of the invention. Other aspects, advantages and modifications within the scope of the invention will be apparent to those skilled in the art to which the invention pertains. The following examples describe preferred embodiments of the invention as shown in the figures.

Explanation of symbols:

| | |
|---|---|
| 10 | Master cylinder |
| 11 | Wheel cylinder |
| 12 | Main brake line |
| 12a | Main brake line on master cylinder side |
| 12b | Main brake line on wheel cylinder side |
| 13 | Pressure control valve unit |
| 14 | Return line |
| 15 | Outlet valve |
| 16 | Auxiliary reservoir |
| 17 | Motor |
| 18 | Hydraulic pump |
| 23 | Inlet valve |
| 24 | Switching valve |
| 25 | Non-return valve |
| 26 | Release channel |
| 30 | Housing |
| 31 | Housing cavity |
| 32 | Magnetic core |
| 32a | Axial cavity |
| 32b | Small-diameter segment |
| 32c | Extension cavity |
| 32d | Inlet valve valve seat |
| 32e, 32f | Through-ducts |
| 32g | Primary constricted channel |
| 32h | Switching valve valve plug |
| 32i | Notched groove |
| 32j | Press fit cavity |
| 33 | Sleeve |
| 34 | Armature |
| 35 | Valve plunger |
| 35a | Inlet valve valve plug |
| 36 | Primary spring |
| 37 | Coil assembly |
| 38 | Retainer ring |
| 39 | Piston |
| 39a | Axial cavity |
| 39b | Switching valve valve seat |
| 39c | Secondary constricted channel |
| 40 | Secondary spring |
| 41 | Seal |
| 42 | Primary pressure chamber |
| 43 | Secondary pressure chamber |
| 44 | Solenoid valve for switching to TCS operation |
| 45 | Auxiliary line |
| 46 | Selector valve |

EXAMPLE 1

One embodiment of this invention is explained below with reference to the diagrams.

Overall Configuration

Figure 2:
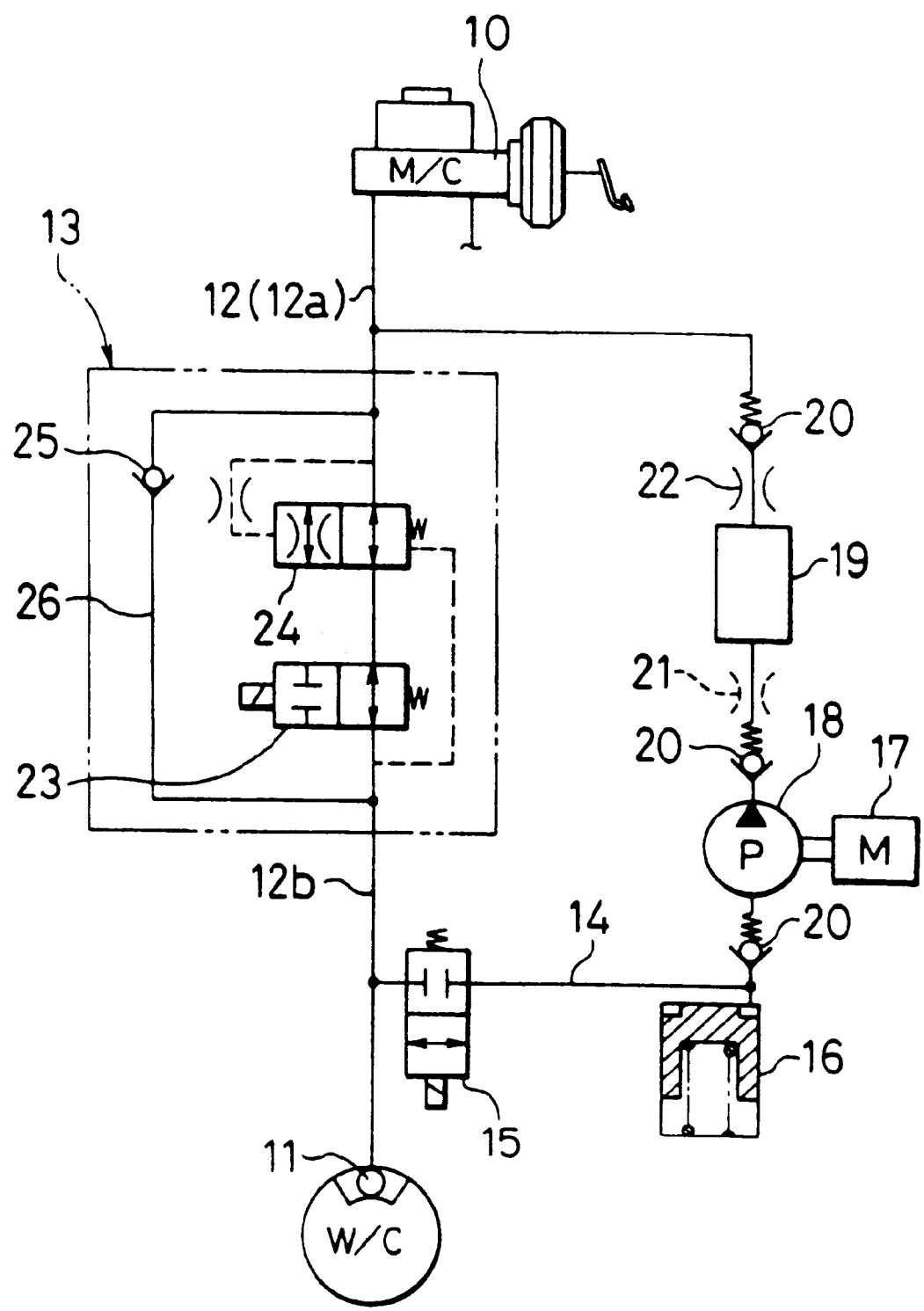
FIG. 2 illustrates the brake line configuration for a hydraulic brake device equipped with a pressure control valve unit.

FIG. 2 illustrates the brake lines of a hydraulic brake device for use in a vehicle equipped with an antilock brake system (ABS).

The normally-open pressure control valve unit 13 of this invention is installed in the main brake line 12 linking the master cylinder 10 and the wheel cylinder 11. A return line 14 is connected to the main brake line 12 on either side of said pressure control valve unit 13, and a nonnary-closed outlet valve 15, an auxiliary reservoir 16, a hydraulic pump 18 operated by a motor 17, and a dumping chamber 19 are arranged in series in said return line. The brake pressure of the wheel cylinder 11 is thus routed to the upstream side of said pressure control valve unit 13, that is, the master cylinder 10 side of the main brake line 12, via the outlet valve 15 and hydraulic pump 18. A non-return valve 20 and constrictions 21, 22 are also installed in said return line 14.

Pressure Control Valve Unit

The pressure control valve unit 13 is a composite valve housing a normally-open electromagnetically-actuated inlet valve 23 and a normally-open pressure-actuated switching valve 24 positioned upstream of said inlet valve 23. A release channel 26 with attached non-return valve 25 functions as a bypass and is linked to the main brake line 12a between the upstream side of said inlet valve 23 and the downstream side of said switching valve 24.

Said switching valve 24 is a pressure-actuated normally-open two-position-two-way valve which switches from the open to the constricted state when the difference in pressure acting on the primary pressure chamber with passage to the master cylinder 10 and on the secondary pressure chamber with passage to a wheel cylinder 11 exceeds a threshold value.

FIG. 1 shows the configuration of the pressure control valve unit 13. A housing cavity 31 of variable diameter is molded in the housing 30, and the main brake line 12a with passage to the master cylinder and the main brake line 12b with passage to the wheel cylinder respectively are bored through said housing cavity 31.

A magnetic core 32, forming part of a solenoid valve, is inlaid into the housing cavity 31 and is affixed together with the hem of a dome-shaped sleeve 33 mounted externally around said magnet core 32 to the housing 30 by caulking or other means. An armature 34 is housed such that it can slide in the closed end of said sleeve 33, and a primary spring 36 is compressed between said armature 34 and the magnetic core 32. The valve plunger 35 integrally molded to said armature 34 is inserted through the axial cavity 32a within the magnetic core 32. Finally, a donut-shaped core assembly 37 is mounted externally around the sleeve 33, and is restrained by, for example, the retaining ring 38 fitted around said sleeve. This configuration as described to this point is the same as any publicly-known normally-open solenoid valve.

A small-diameter segment 32b is molded on that end of the magnetic core 32 positioned within the housing cavity 31, and a piston 39 is mounted externally around said small-diameter segment 32b such that it can slide. A secondary spring 40 is compressed between said small-diameter segment 32b and said piston 39, and energizes said piston towards the closed end of the housing cavity 31.

Figure 3:
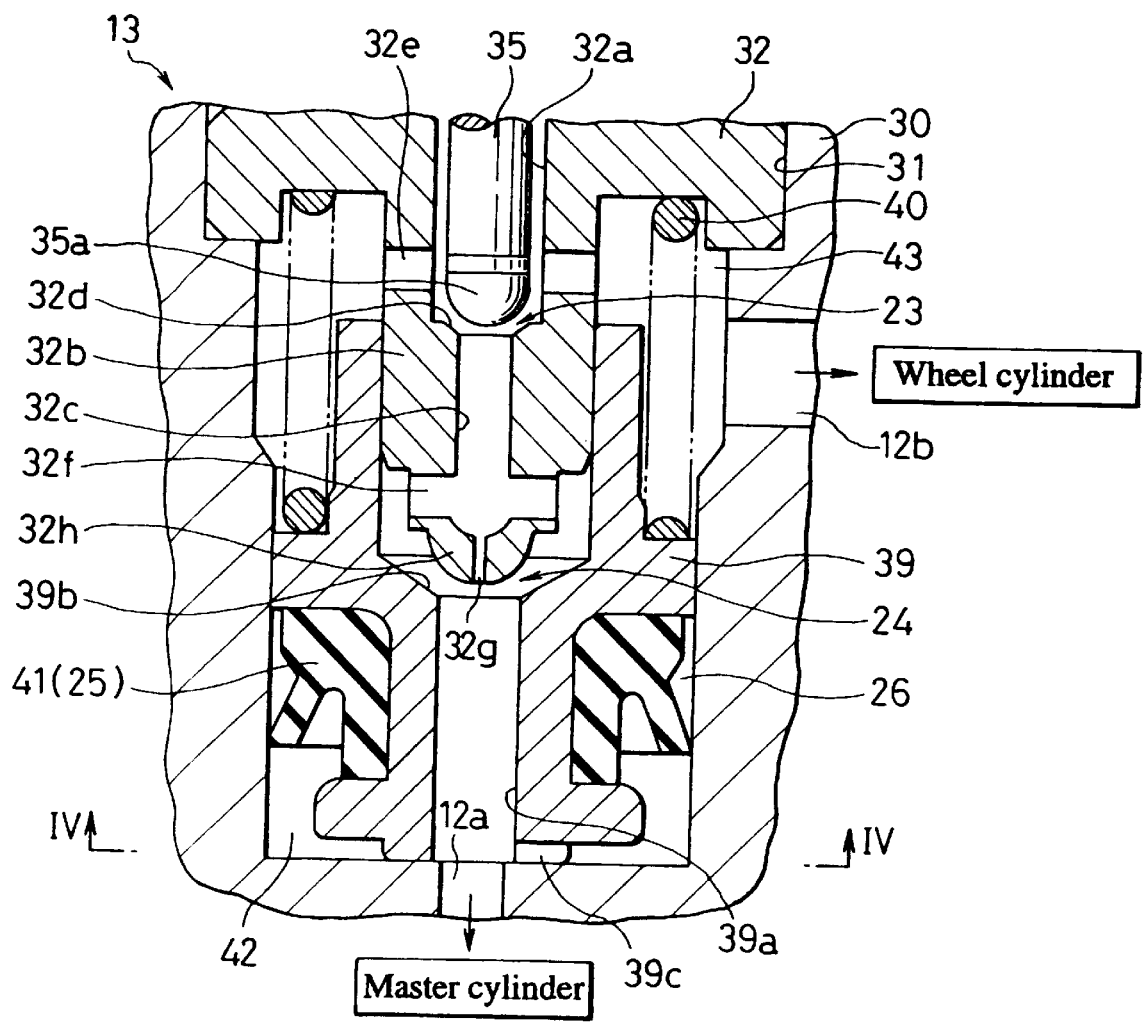
FIG. 3 is an expanded cross sectional diagram of the principal components of the pressure control valve unit.

Within the pressure control valve unit 13, the inlet valve 23 is formed inside said small-diameter segment 32b, and said switching valve 24 is formed between the small-diameter segment 32b on the upstream side of said inlet valve 23 and the piston 39. The configuration of these two valves is shown in FIG. 3. An extension cavity 32c extends down from the axial cavity 32a of said small-diameter segment 32b, and the valve seat 32d of said inlet valve 23 is formed at the boundary between the axial cavity 32a and the extension cavity 32c. Said valve seat 32d and the valve plug 35a on the end of the valve plunger 35 form the normally-open inlet valve 23. However, said valve seat 32d need not be positioned inside the small-diameter segment 32b, and can be positioned instead inside the magnetic core 32.

Through-ducts 32e and 32f with passage to said axial cavity 32a and extension cavity 32c respectively are bored in the radial direction through the small-diameter segment 32b. As well, a small-diameter primary constricted channel 32g is molded on the end of the small-diameter segment 32b on the upstream side of the inlet valve 23.

A axial cavity 39a with variable diameter is molded in the axial center of piston 39, and the said small-diameter segment 32b of the magnetic core 32 is housed inside the large-diameter segment of said cavity. The switching valve 24 is configured from the valve seat 39b molded inside said axial cavity 39a, and the valve plug 32h molded on the tip of the magnetic core 32. Said piston 39 is energized by the spring force of the secondary spring 40 so that the switching valve 24 is normally-open.

A seal 41 is mounted around the external circumference of the piston 39, and divides that portion of the housing cavity 31 enclosed by the magnetic core 32 into a primary pressure chamber 42 and secondary pressure chamber 43. Said primary pressure chamber 42 has passage to the main brake line 12a on the master cylinder side, and said secondary pressure chamber 43 has passage to the main brake line 12b on the wheel cylinder side respectively.

The seal 41 forms a release channel 26 which allows brake fluid between the outer circumference of the piston 39 and the housing cavity 31 to flow only in the direction from the secondary pressure chamber 43 (wheel cylinder) to the primary pressure chamber 42 (master cylinder), and at the same time, functions as a non-return valve 25 to prevent brake fluid from flowing in the reverse direction.

Figure 4:
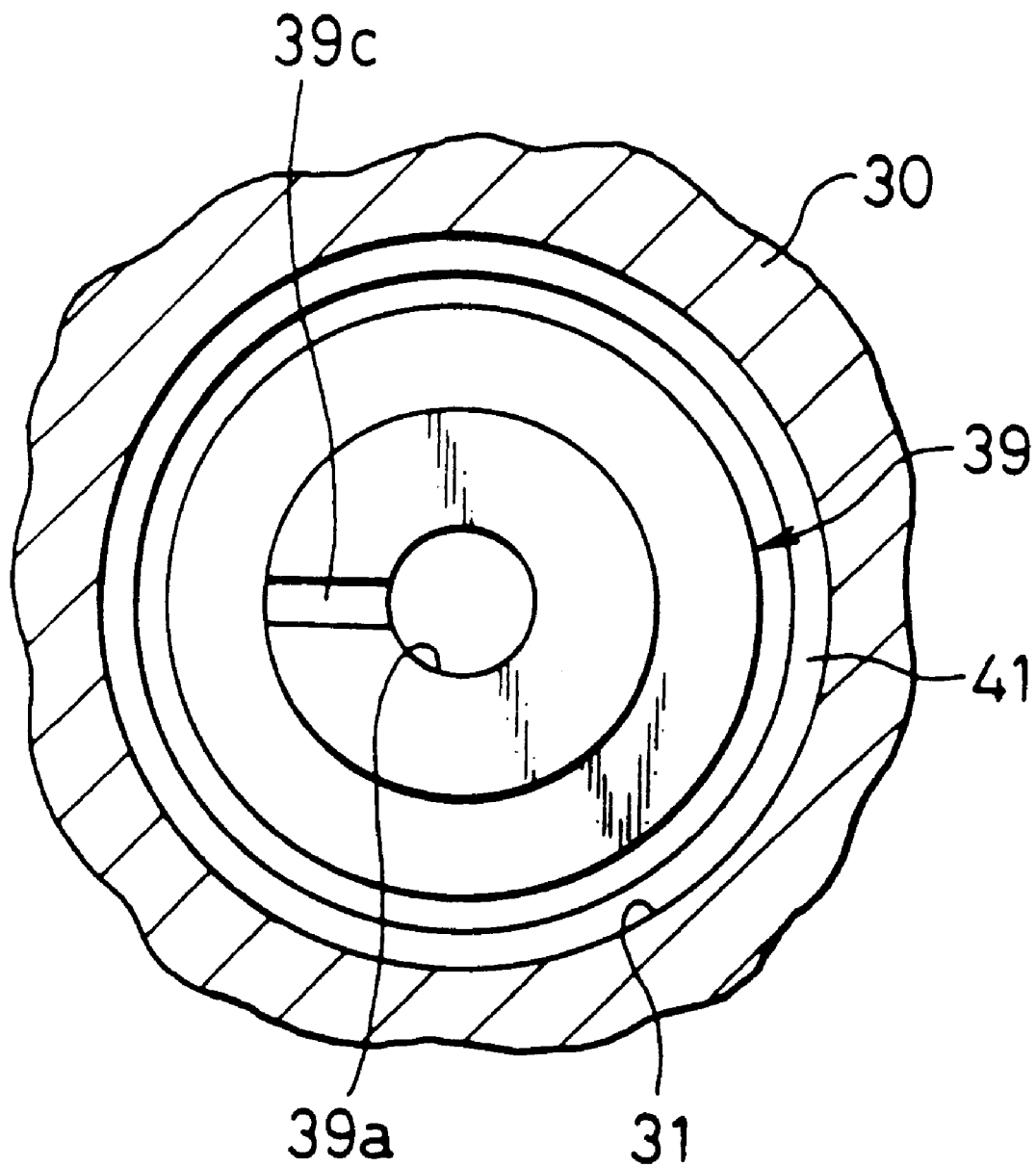
FIG. 4 is a cross sectional diagram of FIG. 3 as dissected through IV—IV.

As shown in FIG. 3 and FIG. 4, a groove is molded on the end surface of the piston 39, and a secondary constricted channel 39c is formed by said groove and the bottom face of the housing cavity 31.

Operation

The operation of the hydraulic brake device and the pressure control valve unit is explained next.

(1) During Normal Braking

FIG. 2 shows the state of the brake lines during normal braking. Since no locking of the wheels is detected during a normal braking operation, no power is supplied to the pressure control valve unit 13 or the motor 17. Accordingly, the pressure generated at the master cylinder passes through valves 23 and 24, the structural elements of the pressure control valve unit 13, and reaches the wheel cylinders 11 via the main brake line 12.

The operation of the pressure control valve unit 13 during normal braking is explained using FIG. 1 and FIG. 3. As shown in FIG. 1, since the armature 34 is energized by the spring force of the primary spring 36 in the upward direction as shown in the diagram, then as shown in the expanded diagram of FIG. 3, the valve plug 35a of the inlet valve separates from the valve seat 32d on the magnetic core 32, and the inlet valve 23 remains open.

Meanwhile, the secondary spring 40 is energizing the piston 39 in the downward direction of the diagram, in which case the valve seat 39b of the switching valve is separated from the corresponding valve plug 32h and the switching valve 24 also remains open. As a result, during normal braking, brake pressure flows back and forth between the master cylinder 10 and the wheel cylinder 11 via the open pressure control valve unit 13 and the main brake line 12.

If the secondary constricted channel 39c was not molded in the device, then if the driver were to brake suddenly while the switching valve 24 was open, a large amount of brake fluid would flow into the primary pressure chamber 42 causing the piston 39 to slide erroneously in the direction to close the switching valve 24 resulting in inadequate braking pressure in the wheel cylinder. Conversely, with the presence of the secondary constricted line 39c, only a small amount of brake fluid will flow into the primary pressure chamber 42. In this case, the piston win not move in error during sudden braking, providing adequate braking pressure at the wheel cylinders.

(2) During an ABS Operation (a) Startup of Electrical Components

As shown in FIG. 2, if the electronic control unit, not shown in the diagram, detects that the wheels are about to lock during braking, power is supplied to the inlet valve 23 and motor 17 of the pressure control valve unit 13. Operation of the motor starts the pump 18, and ip. a parallel operation, the valve mechanisms of the inlet valve 23 and outlet valve 15 start to open and close. With that, the pressure to a wheel cylinder 11 is repeatedly decreased, increased, or maintained as appropriate to prevent said wheel from locking. During pressure control, the brake fluid in the wheel cylinder 11 is sucked out through the outlet valve 15, and fed to the main brake line 12 on the upstream side of the pressure control valve unit 13 via the return line 14.

(b) Operation of Inlet Valve

Figure 5:
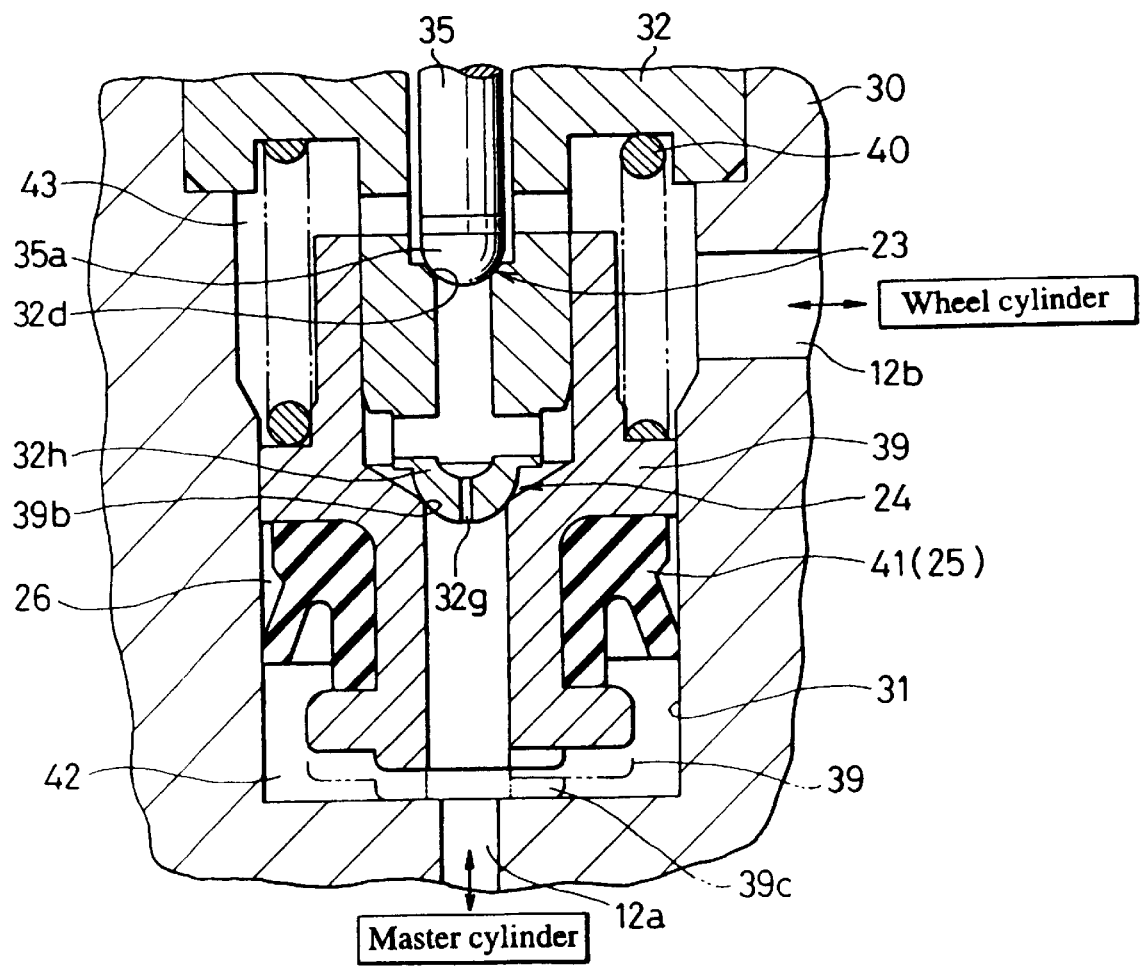
FIG. 5 is an expanded cross sectional diagram of the principal components of the pressure control valve unit during an ABS control operation.

Next, the operation of the pressure control valve unit 13 during an ABS control is explained. As the coil assembly 37 in FIG. 1 is energized electrically, an electromagnetic force is generated which causes the armature 34 to overcome the spring force of the primary spring and slide downward (in the diagram). With that action, as shown in FIG. 5, the valve plug 35a of the inlet valve on the tip of the valve plunger 35 becomes seated in the valve seat 32d to close the inlet valve 23. Alternatively, said inlet valve 23 opens when the valve plug 35a becomes separated from the valve seat 32d.

(c) Operation of Switching Valve

As shown in FIG. 5, when the inlet valve 23 closes, the pressure in the secondary pressure chamber 43 is maintained, then if the outlet valve is opened from that state, the pressure of the wheel cylinder and the secondary pressure chamber 43 is reduced. However, the pressure of the primary pressure chamber 42 is not reduced, in which case a pressure differential is generated between the primary pressure chamber 42 and secondary pressure chamber 43.

If the pressure of the primary pressure chamber 42 becomes greater than that of the secondary pressure chamber 43 plus the spring force of the secondary spring 40, the piston 39 overcomes the spring force of the secondary spring 40 and slides in the direction to compress said secondary chamber 43. In doing so, the valve seat 39b of the piston 39 closes against the valve plug 32h of the switching valve, causing it to switch from the main brake line to the primary constricted channel 32g.

(d) Dampening of Noise, Vibration, and Harshness by Switching Valve

As the switching valve 24 switches to the primary constricted channel 32g, the amount of brake fluid from the master cylinder to the inlet valve 23 is restricted, in which case, the pulsation of the brake fluid arising from the opening and closing of the inlet valve 23 is reduced. Moreover, as the generated brake fluid pulses disseminate from the inlet valve 23 to the master cylinder, the pulses pass through the primary constricted line 32g and are therefore further attenuated. Accordingly, the dual action of a reduced generation of brake fluid pulses and an attenuation of the pulses as they disseminate causes a noticeable reduction in the generation of the noise vibration harshness.

(e) Release Operation

When the driver eases up on the brake pedal, the brake fluid bypasses both the inlet valve 23 and the switching valve 24 and is routed through the release channel 26 formed between the housing cavity 31 and the seal ring 41, and immediately returns to the master cylinder.

EXAMPLE 2

Figure 6:
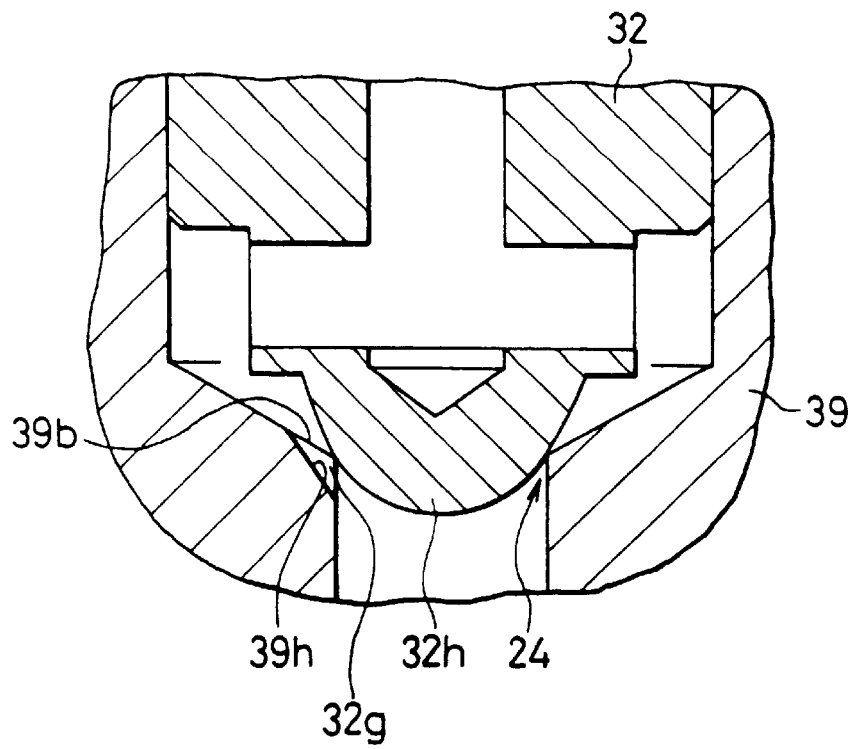
FIG. 6 is an expanded cross sectional diagram of the valve mechanism of the switching valve showing an example of the shape of another primary constricted channel.
Figure 7:
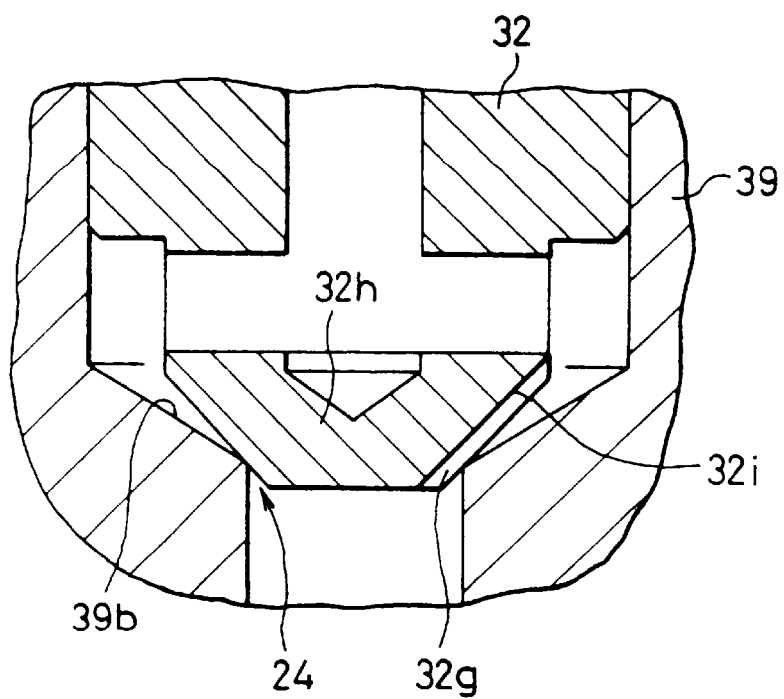
FIG. 7 is an expanded cross sectional diagram of the valve mechanism of the switching valve showing an example of the shape of another primary constricted channel.

FIG. 6 and FIG. 7 illustrate other embodiments of this invention in which the primary constricted channel 32g of the switching valve 24 is positioned in different locations. In explaining this configuration, those components which are the same as those in Example 1 are marked with the same symbol, and a detailed explanation is omitted here.

FIG. 6 illustrates the case where a notched groove 39h is molded on the surface of the valve seat 39b of the piston 39 which forms part of the valve mechanism of the switching valve 24, and the primary constricted channel 32g is formed between said notched groove 39h and the outer circumference of the valve plug 32h.

FIG. 7 illustrates the case where a notched groove 32i is formed on the edge of the outer circumference of the valve plug 32h, and the primary constricted channel 32g is formed between said notched groove 32i and the valve seat 39b.

EXAMPLE 3

Figure 8:
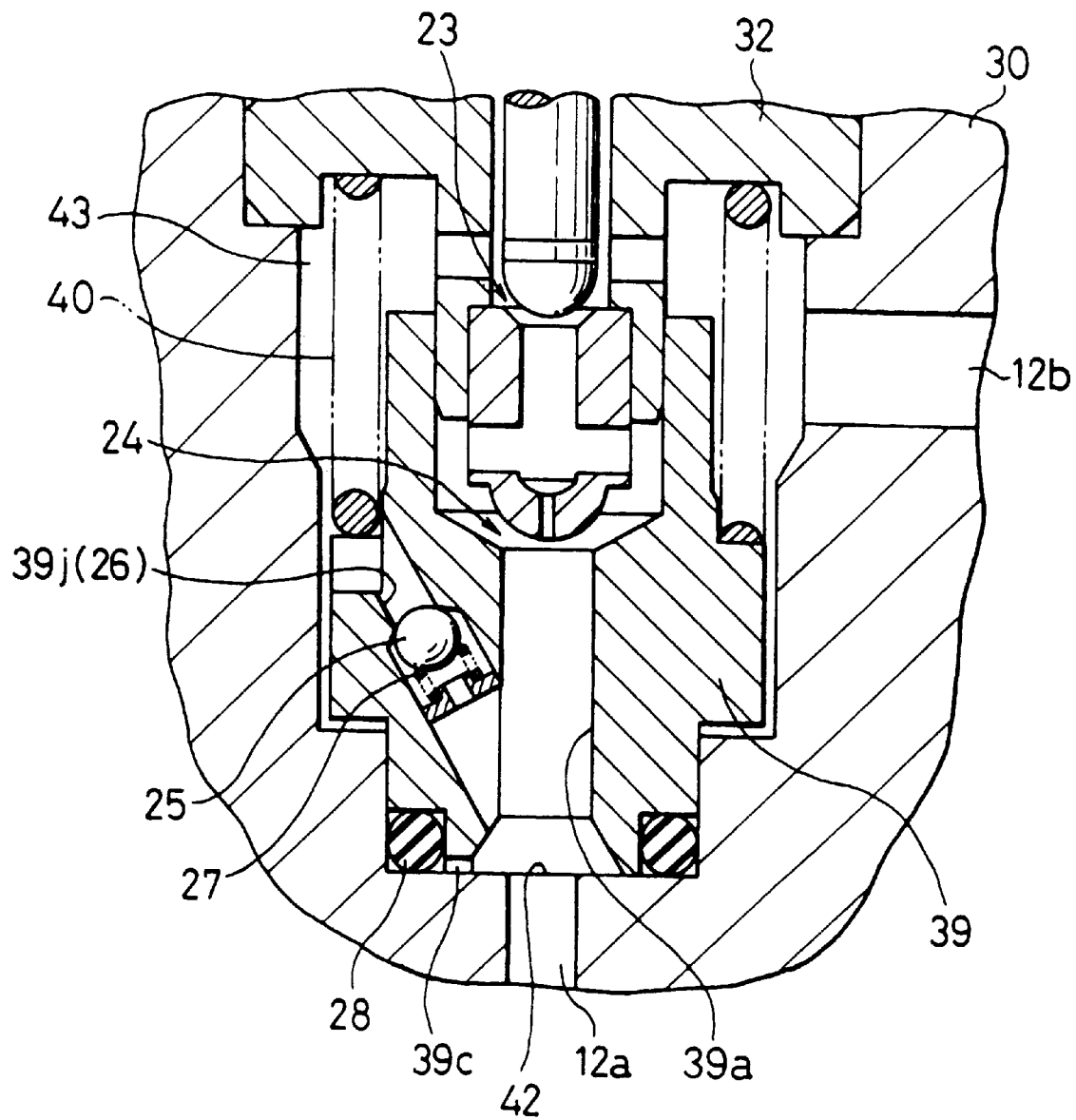
FIG. 8 is an expanded cross sectional diagram of the pressure control valve unit in which a release channel is molded in the piston.

FIG. 8 illustrates another embodiment in which the release channel 26 is molded inside the body of the piston 39. A cavity 39j is bored in a portion of the body of piston 39 to allow passage between the secondary pressure chamber 43 and the axial cavity 39a of the piston 39; and a ball-type non-return valve 25 is set inside said cavity 39j to form the release channel 26. Said non-return valve 25 is energized by the force of the spring 27 to abut against the stepped face (valve seat) of the cavity 39j, and is configured to be a one-way valve which allows brake fluid to only flow in the direction from the secondary chamber 43 to the main brake line 12a on the master cylinder side.

In addition, the seal 28 mounted around the external circumference of the piston 39 provides a fluid-tight seal between the primary and secondary pressure chambers 42, 43.

EXAMPLE 4

Figure 9:
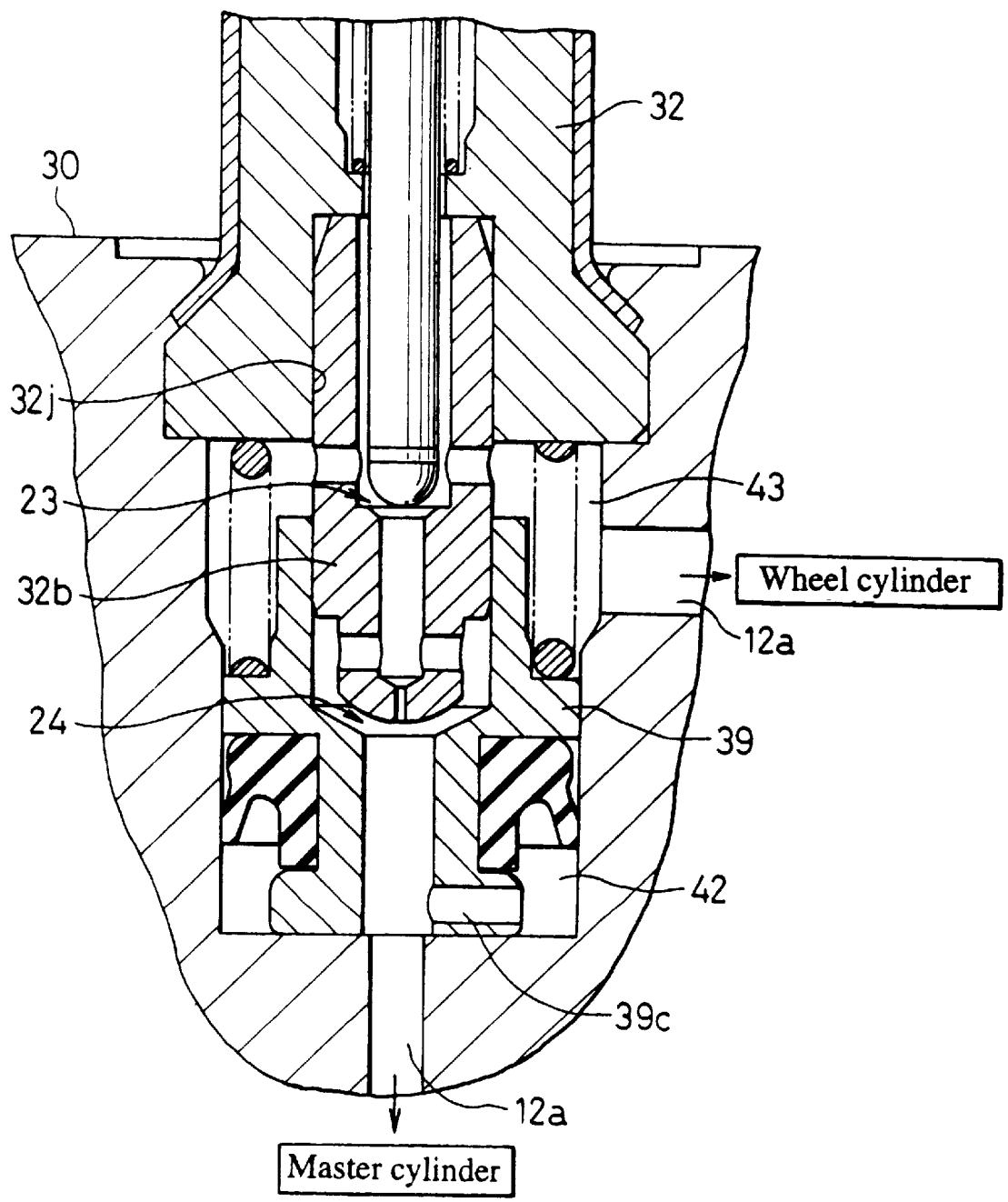
FIG. 9 is an expanded cross sectional diagram showing an example of the shape of another secondary constricted channel.

FIG. 9 illustrates another embodiment of this invention in which the secondary constricted channel 39c is configured from a small cavity bored on the side face of the piston 39 in order to provide constant passage between the main brake line 12a on the master cylinder side and the primary pressure chamber 42.

As shown in FIG. 1, the small-diameter segment 32b can be integrally molded with the magnetic core 32, but as shown in FIG. 9, the small-diameter segment, built as a separate body, can also be integrated by force fitting it into the press fit cavity 32j of the magnetic core.

EXAMPLE 5

Figure 10:
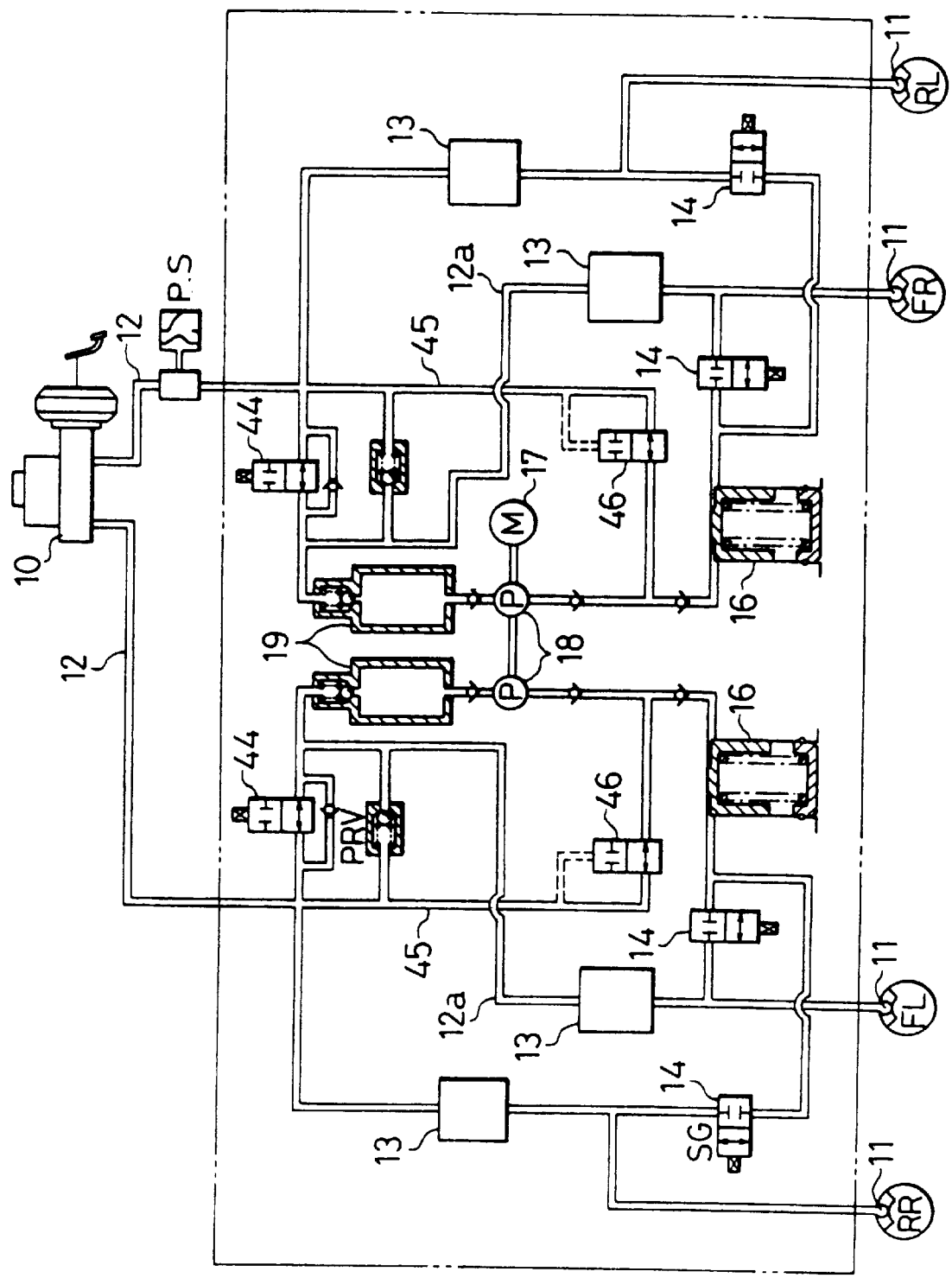
FIG. 10 illustrates the brake lines for a hydraulic brake device for use in vehicles equipped with ABS and TCS control.

This invention can be applied as well to a vehicle equipped with both an ABS and TCS device. FIG. 10 illustrates an example of the brake lines of a hydraulic brake device for a vehicle equipped with a TCS device. This embodiment differs from the previous examples in two ways. First a normally-open solenoid valve 44 for switching to TCS is installed in the main brake line 12a on the upstream side of the pressure control valve unit 13. Second, an auxiliary line 45 is connected between the main brake line 12a on the upstream side of said pressure control valve unit 13 and the return line 14, and a pressure-actuated selector valve 46 is installed in said auxiliary line. Said solenoid valve 44 is closed only during TCS control.

This invention has the following advantages.

1. Incorporation of the switching valve into the inlet valve provides a compact, inexpensive integrated pressure control valve unit.

2. The molding of a constricted channel on the switching valve decreases the pulsation of the brake fluid that is generated as the inlet valve opens and closes during a control operation. Moreover, as the brake fluid pulses are transmitted from the inlet valve to the master cylinder, the pulses pass through the constricted channel where they would be attenuated further. This dual action of a reduced generation of brake fluid pulses and an attenuation of the pulses as they disseminate causes a noticeable reduction in the generation of noise, vibration, and harshness.

3. The constricted channel can be molded by a simple process such as boring a small cavity in the small-diameter segment of the magnetic core which forms part of the switching valve; or by molding a notched groove either on the valve seat or the valve plug of the switching valve.

4. A secondary constricted channel with constant fluid passage between the main brake line on the master cylinder side and the primary pressure chamber will prevent erroneous operation of the switching valve during sudden braking.

5. A release channel molded in the piston enables the fluid in the wheel cylinder to be returned immediately to the master cylinder.

What is claimed is:

1. A pressure control valve unit for a hydraulic brake device comprising:

a normally-openinlet valve, said inlet valve located in a housing cavity in a main brake line between a master cylinder and one or more wheel cylinder;

a switch valve having a wide channel and a constricted channel, said switching valve located in said housing cavity in the main brake line between the master cylinder and the inlet valve; and a piston having an internal switching valve seat for the switching valve, wherein said piston is energized by a spring in the direction of a normally-open valve and keeping the wide channel for said switching valve;

wherein said switching valve routes brakes fluid through the wide channel and the constricted channel during normal operation, and switches during a brake pressure control operation with a pressure differential between the master cylinder side and the wheel cylinder side to route brake fluid through the constricted channel.

2. The pressure control valve unit of claim 1, wherein the inlet valve further comprises: a sleeve affixed to the housing cavity; an armature slidably housed within the sleeve and having integrally molded inlet valve plug; a magnetic core affixed to the housing cavity having integrally molded on it an inlet valve seat and a small-diameter segment through which the inlet valve plug passes; and a coil assembly that operates the armature mounted around the sleeve;

wherein said magnetic core comprises a switching valve plug and a constricted channel molded on the tip of the small-diameter segment; and wherein said piston is mounted externally around said small-diameter segment of the magnetic core and divides said housing cavity into a primary pressure chamber, with passage to the master cylinder, and a secondary pressure chamber, with passage to each wheel cylinder.

3. The pressure control valve unit of claim 2, wherein the piston slides such that the switching valve closes and switches to a constricted channel when the difference between the pressure acting on the primary pressure chamber with passage to the master cylinder and on the secondary pressure chamber with passage to a wheel cylinder exceeds a threshold value.

4. The pressure control valve unit of claim 2, wherein a notched groove forming a constricted channel is molded on the switching valve seat.

5. The pressure control valve unit claim 2, wherein in a notched groove forming a constricted channel is molded around the external circumference of the switching valve plug.

6. The pressure control valve unit of claim 2, wherein a groove molded between the bottom face of the housing cavity and the end face of the piston is formed to provide constant passage between the main brake line on the master cylinder side and the primary pressure chamber.

7. The pressure control valve unit of claim 2, wherein a small cavity bored on the side face of the piston is formed to provide constant passage between the main brake line on the master cylinder side and the primary pressure chamber.

8. The pressure control valve unit of claim 2, wherein a seal is mounted externally around said piston to form a release channel that allows brake fluid between the housing cavity and the circumference of the piston to flow only from the secondary pressure chamber to the primary pressure chamber.

9. The pressure control valve unit of claim 3, wherein:

a notched groove forming a constricted channel is molded on the switching valve seat;

a groove molded between the bottom face of the housing cavity and the end face of the piston is formed to provide constant passage between the main brake line on the master cylinder side and the primary pressure chamber; and a seal is mounted externally around said piston to form a release channel that allows brake fluid between the housing cavity and the circumference of the piston to flow only from the secondary pressure chamber to the primary pressure chamber.

10. The pressure control valve unit of claim 3, wherein:

a notched groove forming a constricted channel is molded around the external circumference of the switching valve plug;

a groove molded between the bottom face of the housing cavity and the end face of the piston is formed to provide constant passage between the main brake line on the master cylinder side and the primary pressure chamber; and a seal is mounted externally around said piston to form a release channel that allows brake fluid between the housing cavity and the circumference of the piston to flow only from the secondary pressure chamber to the primary pressure chamber.

* * * * *